(12) United States Patent
Matuonto et al.

(10) Patent No.: US 12,146,471 B2
(45) Date of Patent: Nov. 19, 2024

(54) WIND POWER PLANT WITH POWER CONVERSION SYSTEM

(71) Applicant: Siemens Gamesa Renewable Energy Innovation & Technology S.L., Sarriguren (ES)

(72) Inventors: Marco Matuonto, Alicante (ES); José Luis Rodriguez Izal, Burlada (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 62 days.

(21) Appl. No.: 18/009,863

(22) PCT Filed: Jun. 15, 2021

(86) PCT No.: PCT/EP2021/066061
§ 371 (c)(1),
(2) Date: Dec. 12, 2022

(87) PCT Pub. No.: WO2021/255022
PCT Pub. Date: Dec. 23, 2021

(65) Prior Publication Data
US 2023/0243338 A1    Aug. 3, 2023

(30) Foreign Application Priority Data

Jun. 16, 2020  (EP) ..................................... 20382520
May 7, 2021    (WO) ................. PCT/EP2021/062164

(51) Int. Cl.
*F03D 7/02*    (2006.01)
*F03D 9/00*    (2016.01)
(Continued)

(52) U.S. Cl.
CPC .......... *F03D 7/0284* (2013.01); *F03D 9/007* (2013.01); *H02J 3/16* (2013.01); *H02J 3/381* (2013.01);
(Continued)

(58) Field of Classification Search
CPC  F03D 7/0284; F03D 9/007; H02J 3/16; H02J 3/381; H02J 2300/24; H02J 2300/28
See application file for complete search history.

(56) References Cited

U.S. PATENT DOCUMENTS

| 6,239,513 B1 * | 5/2001 | Dean ........................ H02J 9/066 307/64 |
| 2008/0088131 A1 | 4/2008 | Thisted |
| 2014/0042818 A1 | 2/2014 | Blacha et al. |

FOREIGN PATENT DOCUMENTS

WO    2019/064166 A1    4/2019

OTHER PUBLICATIONS

J. Matevosyan et al., "Grid-Forming Inverters: Are They the Key for High Renewable Penetration?," IEEE Nov.-Dec. 2019.
(Continued)

*Primary Examiner* — Sean Gugger
(74) *Attorney, Agent, or Firm* — Schmeiser, Olsen & Watts LLP

(57) ABSTRACT

A wind power plant for providing electrical power to a utility grid is provided, the wind power plant including: at least one wind turbine having a wind turbine generator coupled to a wind turbine rotation shaft to which plural rotor blades are mounted, the wind turbine providing electric power at an output terminal; at least one power conversion system, each including: a plant motor electrically coupled and configured to receive the electric power from the output terminal of the at least one wind turbine and convert it into rotational power of a plant motor shaft; a plant generator mechanically (Continued)

Figure 1:
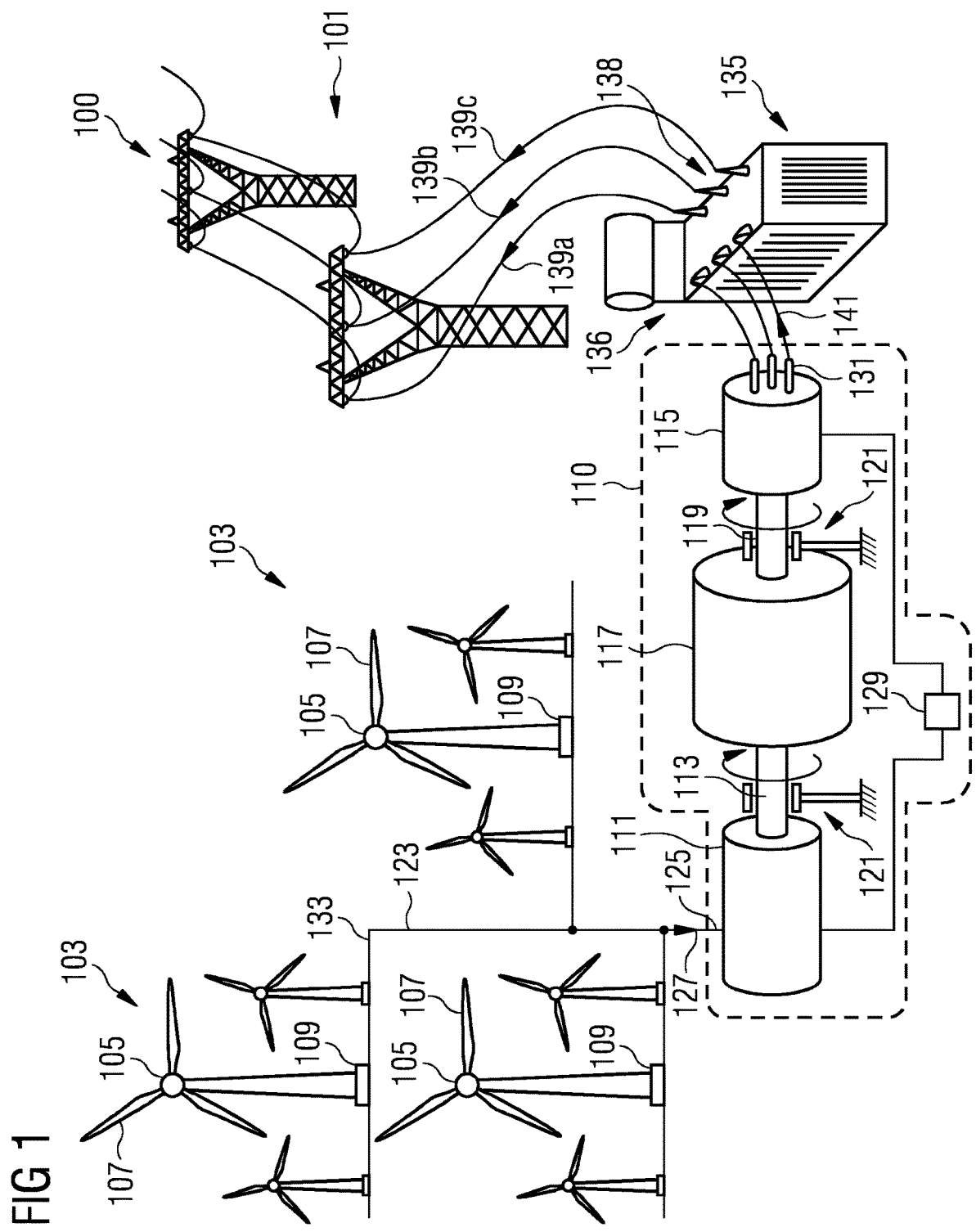

coupled to the plant motor shaft and electrically coupleable to the electric utility grid.

15 Claims, 4 Drawing Sheets

(51) Int. Cl.
  *H02J 3/16* (2006.01)
  *H02J 3/38* (2006.01)
(52) U.S. Cl.
  CPC ....... *H02J 2300/24* (2020.01); *H02J 2300/28* (2020.01)

(56) References Cited

OTHER PUBLICATIONS

Daniel Fraile; "Future System Needs And The Role Of Grid-Forming Converters"; WindEurope; Jul. 2019.
International Search Report for PCT/EP2021/066061, mailed on Sep. 13, 2021.

\* cited by examiner

WIND POWER PLANT WITH POWER CONVERSION SYSTEM

CROSS-REFERENCE TO RELATED APPLICATIONS

This application claims priority to PCT Application No. PCT/EP2021/066061, having a filing date of Jun. 15, 2021, which claims priority to PCT Application No. PCT/EP2021/062164, having a filing date of May 7, 2021, which claims priority to EP Application No. 20382520.3, having a filing date of Jun. 16, 2020, the entire contents all of which are hereby incorporated by reference.

FIELD OF TECHNOLOGY

The following relates to a wind power plant for providing electrical power to a utility grid, wherein the wind power plant comprises at least one power conversion system.

BACKGROUND

An electrical power plant supplies electrical power to a utility grid. It is well known that to assure grid stability, electrical power generation and electrical power consumption must be balanced. Electrical grid operators need to continuously anticipate the amount of expected energy demand to schedule matching energy production.

Up to now, electrical power plants based on synchronous generation, where the primary energy is based on fossil fuels (i.e., carbon, Oil & gas, etc.) are predominant and assure the grid stability. Fossil fuel-based electrical power generation make stronger electrical grids because scheduled demand and real demand can be adjusted when generation-load imbalances appear. This is possible because the primary energy is guaranteed and synchronous generators with large mechanical inertia can balance short generation-load differences.

In synchronous generators the rotating speed and the electrical frequency are directly related. Each conventional synchronous generator of each power plant is coupled to the power grid; therefore, the inertia of the electrical system is the sum of the rotating masses of all synchronous generators coupled to the grid. Using the electrical frequency as key control parameter and taking into account the large inertia of all synchronous generators coupled to the grid, grid stability is controlled in easy way.

Nowadays, due to the increasing decarbonization of the electrical grid, a high penetration of renewable energy like wind, photovoltaic and thermal is replacing conventional generation at a fast pace. But wind and photovoltaics (PVs) based energy are based on asynchronous generation. Wind turbines adopt asynchronous generation because of the need to employ variable speed to optimize energy production. PVs energy adopt asynchronous generation because the primary source is obtained in Direct Current (DC).

The main drawback of the high penetration of renewable energy is that the displacement of synchronous generation, by asynchronous generation, decreases substantially the inertia of the electrical grid.

As is indicated, high renewable penetrations provide no inertia to the system and virtual inertia in renewable generation will be necessary to assure the grid stability. Moreover, renewable energy is intermittent and is very difficult to be scheduled. To avoid losing the control of the electrical grid due to these typical characteristics of renewable generation, grid operators are including special requirements related to virtual inertia, frequency and voltage in the grid codes. Also new functions like grid forming and black-start capability are being included/required.

To meet the new grid codes with extended requirements in inertia, frequency and voltage, different controls and hardware solutions are being investigated. But now there are several problems to properly dimension the renewable energy sources. One key problem is that different countries have different grid code requirements. Each country needs specific control and sometime specific hardware. Also, every year the new grid codes are released, and it is necessary to spend a lot of time in analysis, changes in the product development, validation, modelling and certification. All this makes it difficult for generator systems manufacturers (OEMs) to standardize and optimize their products.

Another problem is related to the power quality. Asynchronous generation has a poorer frequency and voltage waveform quality and therefore the power consumers need to adapt their installations to avoid problems in their plants.

According to the conventional art, renewable power plants including wind turbines are equipped with particular controls and particular hardware to comply with the specific grid codes of different countries. However, it is observed that only a relatively low power quality response is achieved. In particular, for each country, the renewable energy manufacturer is looking for and protecting specific controls and hardware solutions. The low power quality that is now being progressively introduced may generate consumer issues in the years to come. Such issues are nowadays not sufficiently being considered and/or addressed. For example, the utility grid, to which the power of the conventional power plants is provided, may not ensure a stable voltage and/or frequency to plural recipients of the electrical power. Thereby, problems may occur at the recipient's equipment or devices.

Thus, there may be a need for a wind power plant for providing electrical power to a utility grid, wherein the components can be more standardized and wherein the power quality of the power provided to the utility grid is improved. Furthermore, the local grid code requirements may be satisfied to a better degree. Furthermore, the wind power plant may be operable in a reliable manner, including in particular also black start capability. Furthermore, grid code requirements regarding active power and/or reactive power and/or voltage of the utility grid including also participation in frequency control may be complied with in improved manner by the wind power plant.

SUMMARY

An aspect relates to a wind power plant for providing electrical power to a utility grid, the wind power plant comprising: at least one wind turbine having a wind turbine generator coupled to a wind turbine rotation shaft to which plural rotor blades are mounted, the wind turbine providing electric power at an output terminal; at least one power conversion system, each comprising: a plant motor electrically coupled and configured to receive the electric power from the output terminal of the at least one wind turbine (e.g., at a power conversion system input terminal) and convert it into rotational power of a plant motor shaft; a plant generator mechanically coupled to the plant motor shaft and electrically (e.g., coupled to a power conversion system output terminal that is) couplable to the electric utility grid.

The wind power plant may comprise for example 1 to 100 or 1 to 500 wind turbines. The wind power plant may be an offshore or an onshore wind power plant. Furthermore, the wind power plant may comprise one or more power generating devices or equipment which are different from wind turbines, or which are based not on wind energy. This may include equipment which is capable of producing electric energy and/or equipment which is capable of generating mechanical energy.

The electrical power may in particular comprise an AC power, in particular three-phase electrical AC power. The wind turbine generator may for example comprise a synchronous generator, in particular a permanent magnet synchronous generator or a doubly fed induction generator (DFIG), for example. Each wind turbine may comprise a specific wind turbine controller which controls the generator and/or a converter coupled to the generator. The wind turbine converter may in particular comprise an AC-DC-AC converter being capable of converting a variable frequency AC power stream received from the wind turbine generator to a fixed frequency AC power stream, having for example a frequency of 50 Hz or 60 Hz. The wind turbine may further in particular be coupled to a wind turbine transformer which transforms the fixed frequency AC power to a higher voltage value.

The at least one power conversion system may be capable of collecting all power contributions of all wind turbines (and in particular also further energy generating equipment) and supply the power to the plant motor. The plant motor may then drive the plant generator via the motor shaft. The plant generator may finally output the total electrical power (sum of the contributions of the different power generating equipment) to the electric utility grid. Thereby, in particular, a plant transformer may be utilized for transforming to a higher voltage.

By providing the combination of a plant motor coupled to a plant generator, the power quality output by the wind power plant may adhere to a better degree to grid code requirements, in particular regarding voltage and/or active power and/or reactive power.

In a centralized variant of embodiments of the present invention, in particular only one power conversion system is provided to which all wind turbines provide their electrical power and to which optionally further energy generating equipment provides electrical and/or mechanical power. In a decentralized variant of the wind power plant, plural power conversion systems may be present, and each of the plural power conversion systems may receive power of some of the wind turbines of the wind power plant and/or some of the power or some of the other energy generating equipment. Finally, all of the plural power conversion systems may provide their output power to a common busbar which is couplable or coupled to the utility grid, in particular via one or more plant transformers. In particular embodiments it may be advantageous to provide plural conversion systems since in this case, the rating of each of the plural power conversion systems does not need to comply with the total power output of the entire wind power plant.

The motor shaft including all other mechanical components mechanically coupled to the motor shaft may provide a sufficient inertia in order to provide a kind of storage of mechanical energy thereby providing some kind of buffering of energy in case of shortages of energy supply from the wind turbines or in cases of excess energy received from the wind turbines. In particular, some of the energy or power finally supplied to the utility grid may be temporarily stored within the inertial masses coupled or comprised in the plant motor shaft. Thereby, the quality of the power finally supplied from the plant generator of the at least one conversion system to the utility grid may be improved, in particular regarding voltage and/or active power and/or reactive power.

The plant motor may be driven by AC power, in particular three-phase AC power, for example 50 Hz or 60 Hz or even a different frequency. The plant generator may also output AC power, in particular having a frequency of 50 Hz or 60 Hz, in particular providing three-phase AC power.

According to an embodiment of the present invention, the plant generator and/or the plant motor of at least one of the at least one power conversion system comprises a synchronous machine, in particular electrically excited synchronous machine. In the case of using an electrically excited synchronous machine as a plant motor it will be possible to control the voltage in the wind energy plant by controlling the excitation.

When the plant generator and/or the plant motor comprise or consist of a synchronous machine, conventionally available motors or generators may be utilized. The frequency of the AC power output by the plant generator may therefore equal to the electrical speed of the plant generator, being related to the rotational speed, the number of pole pairs etc. The plant motor may rotate in synchronization or in correspondence to the frequency of the AC power received from the wind turbines used to drive the plant motor. Thereby, the wind power plant may be simplified and may be implemented using conventionally available components.

According to an embodiment of the present invention, at least one of power conversion systems further comprises: a mechanical inertial mass, in particular flywheel, coupled or couplable to the respective plant motor shaft.

The mechanical inertial mass may enable to temporarily store rotational energy in the mechanical inertial mass which is coupled to the plant motor shaft. Thereby, it may be enabled to output by the plant generator more constant power than presently produced by the wind turbines and other equipment, if required.

The mechanical inertial mass may not only be driven by the plant motor but optionally also by other energy generating equipment such as a steam turbine and/or gas turbine mechanically coupled to the mechanical inertial mass and/or the respective plant motor shaft. In other embodiments further, the plant motor may be driven additionally to the wind turbines by other element energy generating equipment, such that photovoltaic cells or a thermal energy conversion system.

According to an embodiment of the present invention, a value of the inertia (H [sec]) (of the wind power plant) amounts to between 2 sec and 5 sec. The inertial mass may be configured as a flywheel and contributing to the inertia of the wind power plant. The flywheel may comprise a wheel or a disk of heavy material, such as metal, which is coupled to the plant motor shaft.

In electrical systems inertia (e.g., of the wind power plant or the utility grid) is usually referred to inertia constant H in seconds. To calculate the constant H of the inertia from the mechanical inertia the following equation is used:

$$H[seconds] = \frac{1}{2} J w^2 / S$$

Where J is the mechanical inertia of the mechanical inertial mass (in units $kg*m^2$), w is the rotational mechanical speed and S is the electrical apparent power.

In embodiments of the present invention, it is proposed the introduction of mechanical inertia in the system to increase the inertial constant H (of the wind power plant) to between 2 sec & 5 sec. The inertia added with the mechanical mass in kg*m^2 will be dependent on the Power and speed of system.

According to an embodiment of the present invention, at least one of power conversion systems further comprises: a power conversion system controller being configured to control active power and/or reactive power and/or voltage at a power conversion system output terminal and/or at the utility grid and/or at a power conversion system input terminal based on at least one reference value and/or measurement values related to the utility grid and/or related to a plant grid.

The power conversion system controller may enable to appropriately control the plant motor as well as the plant generator. For different control objectives, one and/or the other, i.e., the plant motor and/or the plant generator, may be controlled. For that, particular control communication lines may be provided between the power conversion system controller and the plant motor and/or the plant generator. In particular, it may be desired and enabled by the power conversion system controller to control the output voltage of the entire wind power plant and/or the output active power and/or the output reactive power of the entire wind power plant. Herein, in particular, the wind turbines connected to the at least one power conversion system do not require to output a power and/or reactive power or voltage which necessarily complies with the respective grid code. In order to provide the electric power satisfying the particular grid code requirements, the conversion system is capable of appropriately shaping the output power in order to comply with requirements regarding voltage, active power/reactive power as it is normally done in conventional electric power plants.

According to an embodiment of the present invention, the power conversion system controller comprises a plant motor controller communicatively coupled to the plant motor and a plant generator controller communicatively coupled the plant generator.

To provide for each, i.e., the plant motor and the plant generator, a respective controller may enable to individually control the plant motor and the plant generator. Thereby, the power quality may be improved, regarding in particular the power supplied to the utility grid but also enabling to improve the power or voltage or reactive power provided at a plant grid (via which the wind turbines and optionally other energy generating equipment is coupled). The respective controllers may comprise partially conventionally available equipment, such as PI controllers which may receive reference values (regarding voltage and/or reactive power and/or active power) as well as receiving actual values (for example regarding voltage and/or reactive power and/or active power) and which provide or generate control signals in dependence of an error value of the reference value and the measurement or feedback values. Thereby, it may be enabled to control for example the plant grid voltage to a desired value and control the utility grid voltage and in particular provide also frequency response in case of frequency deviations in the utility grid from a nominal utility grid frequency.

According to an embodiment of the present invention, the wind power plant further comprises at least one power generating component being different from a wind turbine and being connected such as to supply electrical power and/or mechanical power to the plant motor, the power generating component comprising at least one of: at least one photovoltaic cell; at least one thermal energy storage; and/or at least an Electric Power Storage system e.g., Li-ion batteries; at least one steam turbine; at least one gas turbine, wherein at least one power generating component in particular enables black start of the wind power plant in case of insufficient wind.

Also providing at least one power generating component different or additional to the wind turbines may further improve the quality of the power generated. In particular, the combination with at least one photovoltaic cell and/or at least one thermal energy storage and/or at least one steam turbine and/or at least one gas turbine, and/or at least an Electric Power Storage System e.g., Li-ion batteries, may enable to provide power in mechanical form and/or electrical form to the plant motor in case of changing wind conditions, in particular power which is substantially or approximately constant.

The use of at least an Electric Power Storage System may provide a faster power flow control if compared e.g., with a thermal energy storage.

Black start may refer to the start of the wind power plant after a shutdown, for example after a low wind condition or a disturbance, for example utility grid disturbance causing shutdown of the wind power plant. Furthermore, a diesel generator may be comprised within the wind power plant which may also additionally or alternatively provide black start capability. During black start, one of the power generating components being different from any wind turbine may provide initially electrical power to the wind turbines or to at least one wind turbine in order to enable control functions to be carried out. After the control functions are being carried out, for example involving appropriately yawing the wind turbine or adjusting a blade pitch angle, the respective wind turbines may start operating and provide by themselves electrical energy to the plant grid. Thereupon, more and more wind turbines may start operating and eventually provide power to the plant grid and then also to the plant motor.

According to an embodiment of the present invention, the plant motor controller is configured to receive a plant active power reference signal, to determine individual active power reference signals for the at least one wind turbine and/or the at least one of power generating component based on the plant active power reference signal and supply the individual active power reference signals to the at least one wind turbine and/or the power generating component.

The plant motor controller may for example be communicatively coupled to the plant motor for controlling the operation of the plant motor. For example, the plant motor controller may be coupled to respective stator windings of the plant motor. Thereupon, particular stator currents may be caused in the stator windings of the motor eventually causing the rotor (in particular having permanent magnets mounted thereon) rotate relative to the stator of the plant motor. The plant motor controller may further also at least indirectly control the wind turbines and/or at least one power generating component being different from a wind turbine regarding their active power output. Thereby, the respective individual power outputs of the different energy generating components or equipment may be orchestrated such that the sum of the active power received at the plant motor may comply with desired values. The respective individual active power reference signals may be supplied to respective controllers of the individual power generating equipment.

According to an embodiment of the present invention, the plant motor controller is configured to control the plant grid voltage by controlling the plant motor to output a reference plant grid reactive power to the plant grid, in case of permanent magnet synchronous motor or utilizing an automatic voltage regulator (AVR) in case of electrical excited synchronous generator.

In case of using permanent magnet generators, stator voltage may be controlled with the stator reactive power (leading or lagging). In case of using an electrically excited generator the output voltage may be controlled with the field current, e.g., using an AVR.

Thus, the plant motor controller may also be configured to control the plant grid voltage by appropriately controlling the plant motor to output a reference plant grid reactive power to the plant grid or with appropriately controlling of the field current. When the plant grid voltage complies to desired values, the entire wind power plant may be operated in an improved manner. The automatic voltage regulator may comprise one or more PI controllers which receive for example an error value of the plant grid voltage by deriving a difference between a reference plant grid voltage and a measured or estimated plant grid voltage. The plant grid voltage may be controlled by also controlling the different components of the wind power plant regarding their individual reactive power output. Thus, the plant motor controller may be configured to send respective individual reference reactive power signals to the individual power generating components including the wind turbines which will cause these energy generating components to actually output the individual reactive power as corresponding to the reference reactive power signals. This reactive power may then be received at the plant motor.

According to an embodiment of the present invention, the plant generator controller is configured to control the plant generator to output a reference utility grid reactive power to the utility grid; the plant generator controller in particular thereby utilizing an automatic voltage regulator that receives measurement values regarding utility grid voltage.

When the plant generator is controlled to output a particular i.e., reference utility grid reactive power, it may be enabled to participate to control the voltage of the utility grid or at least contribute to the control of the voltage of the utility grid. The plant generator is an electrically excited synchronous generator. It may be equipped with an automatic voltage regulator (AVR) and the field current may be adjusted to deliver the reactive power to the grid.

The automatic voltage regulator may comprise for example a PI controller which receives an error signal of the utility grid voltage being a difference between a nominal utility grid voltage and an actual utility grid voltage. The utility grid voltage may be controlled for example at a low voltage side or at a high voltage side of a plant transformer optionally included in the wind power plant.

According to an embodiment of the present invention, the wind power plant further comprises a load frequency controller configured: to receive measurement values of a utility grid frequency; to determine a plant active power reference signal based on the utility grid frequency; and to supply the plant active power reference signal to the plant motor controller.

When the power provided to the utility grid is lower than the power as drawn from the utility grid by plural consumers, the utility grid frequency may decrease to be lower than the nominal grid frequency. In this case, it may be required to inject active power from one or more of the power generating equipment or in particular the wind power plant to the utility grid. In particular, the plant active power reference may be determined or calculated based on a difference between the reference or nominal utility grid frequency and the actual utility grid frequency. The active power reference signal then derived may then be supplied to the plant motor controller which may in turn supply plural individual reference active power signals to the plural energy generating devices including the wind turbines. Thereby, the utility grid frequency may be maintained or stabilized at a nominal utility grid frequency.

According to an embodiment of the present invention, at least one wind turbine further comprises a wind turbine converter connected to the wind turbine generator for converting the generator power to a substantially fixed frequency power supplied to the wind turbine output terminal; and/or the plant further comprising: a plant transformer coupled to the output terminal of all of the at least one power conversion system, in order to transform a voltage provided to the electrical utility grid to a higher value.

Thereby, conventional wind turbines may be supported. The wind turbine converter may for example comprise plural controllable switches, such as IGBTs. The plant transformer may be connected to all power conversion systems comprised in the wind power plant. The voltage at the low voltage side of the plant controller may for example amount to between 0.69 kV and 15 kV. The voltage at the high voltage side of the plant transformer may for example amount to between 20 kV and 400 kV.

According to an embodiment of the present invention, the plant comprises exactly one power conversion system to which all wind turbines supply their output power. In this case, a so-called centralized configuration of the wind power plant is established. The centralized version has lower complexity but requires a relatively high rating of the exactly one power conversion system including a relatively high rating of the plant motor and the plant generator.

According to an embodiment of the present invention, the plant comprises at least two power conversion systems whose output terminals are electrically connected to a bus bar which is electrically connected to the utility grid, in particular via a plant transformer. In this case, a decentralized variant of the wind power plant is provided. The decentralized version is more complex and requires more components. However, the rating of the individual power conversion systems is not as high as in the case of the centralized variant. Thereby, conventionally available plant motors and/or plant generators may be utilized for implementation.

In an example, the wind power plant may further comprise a Hydrogen plant.

During certain weather conditions the wind power plant may have a surplus of energy i.e. it may generate more power than it can inject to grid and/or store. In such conditions, the wind power plant may usually avoid generating such extra energy. In order to be able to take advantage of the maximum energy/power generation capacity of the wind power plant, such surplus of energy that can be generated may be provided to the Hydrogen plant which may generate (green) Hydrogen.

The wind power plant may thus be more efficient as it is ensured that under any condition(s) the maximum energy generation capacity of the wind power plant is achieved and/or that all the generated power may be used. Additionally, the wind power plant may also be more versatile as different services and/or products may be generated or provided e.g., electric power and hydrogen.

In some examples, the wind power plant may comprise at least a thermal energy storage and a hydrogen plant. In some examples, the wind power plant may comprise an Electric Power Storage system, e.g., a Li-ion battery, and a hydrogen plant.

The aspects defined above and further aspects of embodiments of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Figure 2:
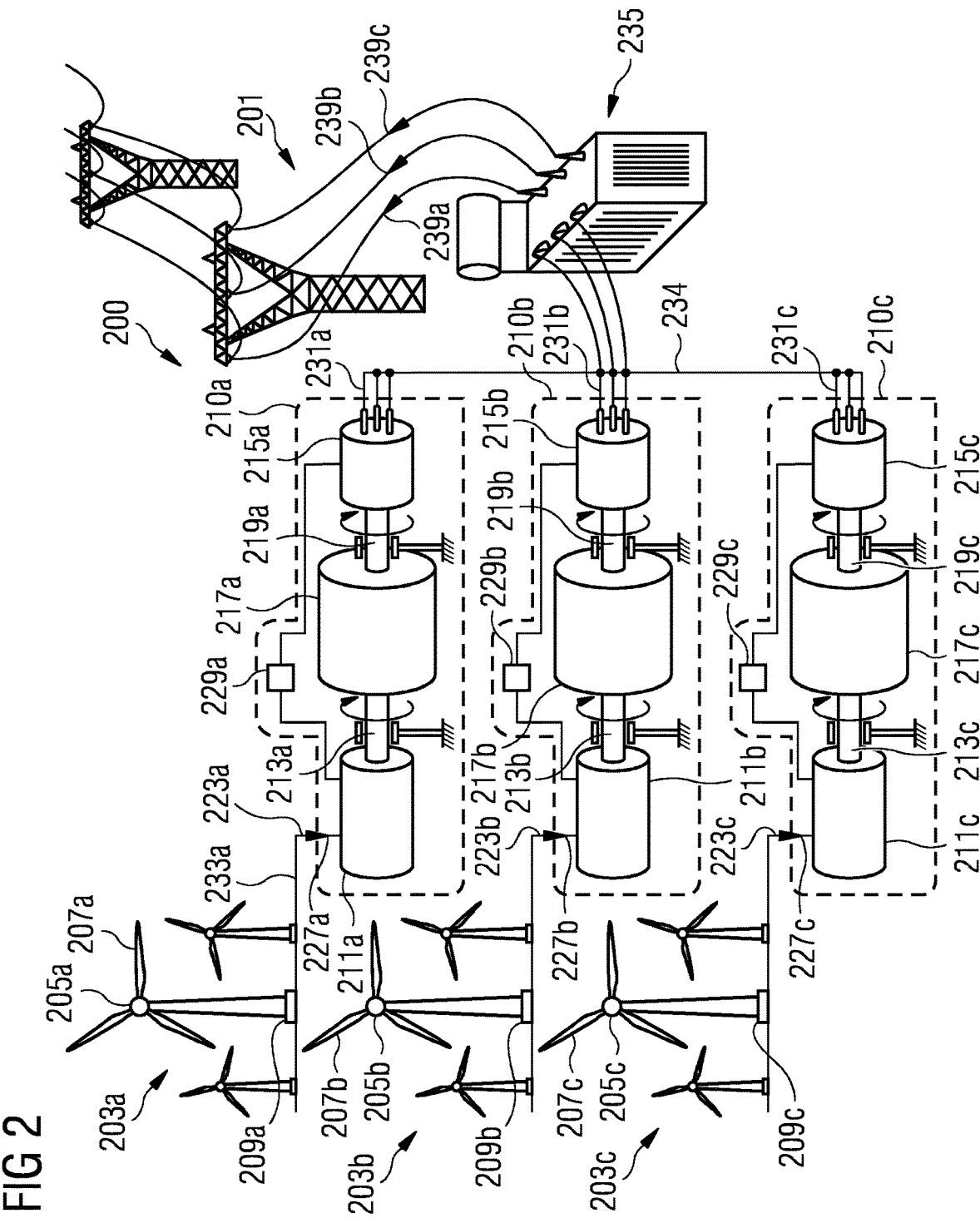
Figure 3:
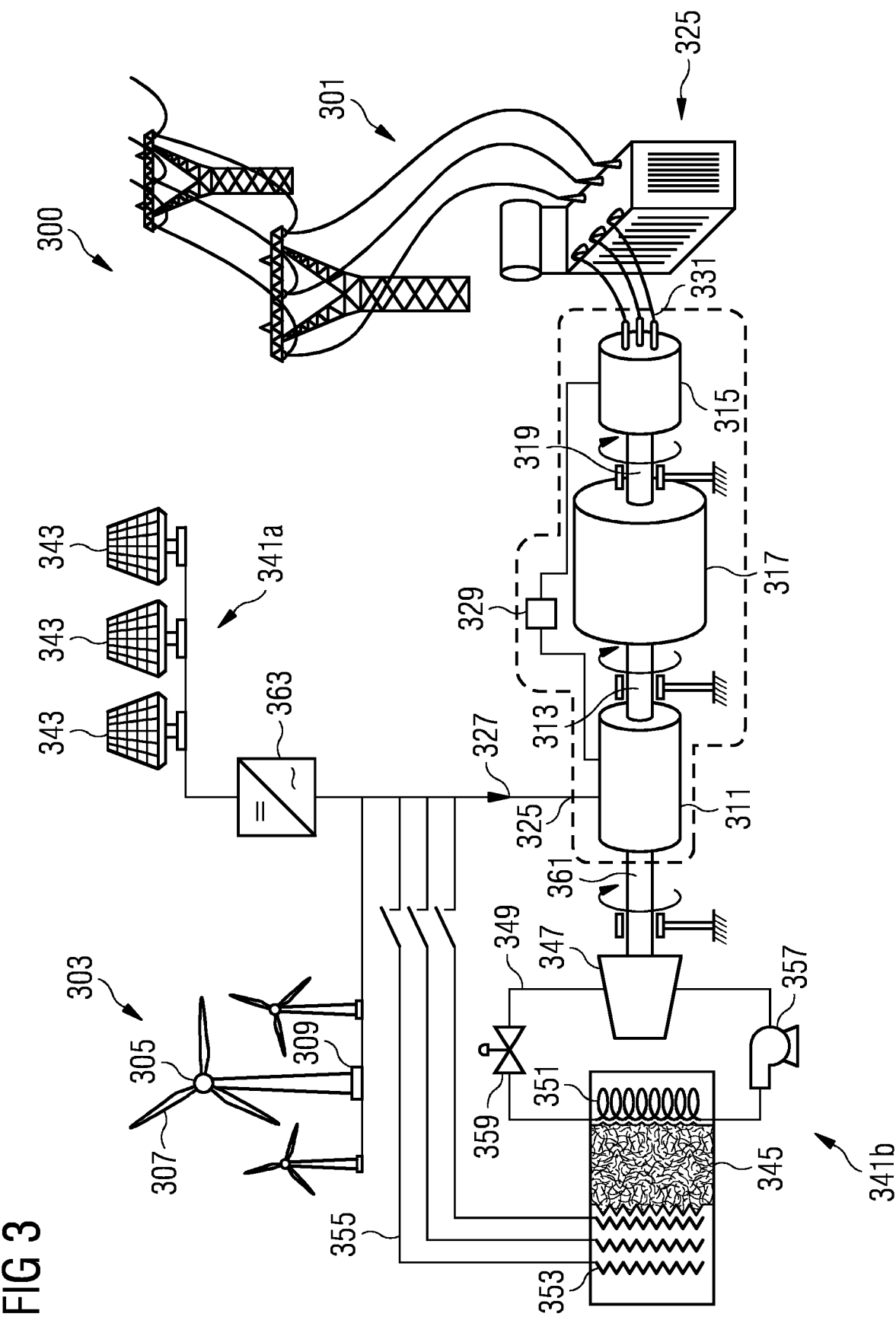
Figure 4:
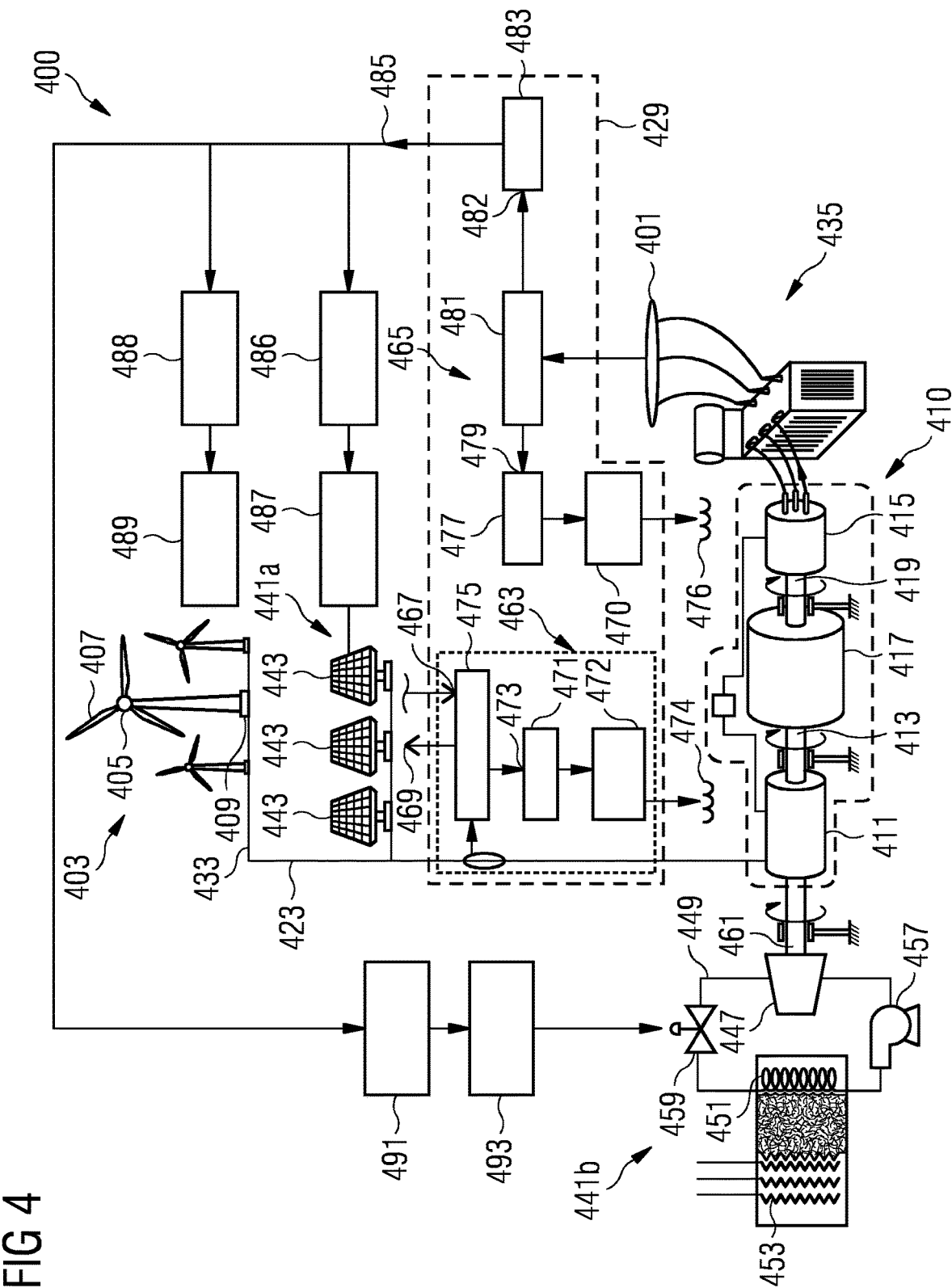

Some of the embodiments will be described in detail, with reference to the following figures, wherein like designations denote like members, wherein:

FIG. 1 schematically illustrates a wind power plant according to an embodiment of the present invention;

FIG. 2 schematically illustrates a wind power plant according to another embodiment of the present invention;

FIG. 3 schematically illustrates a wind power plant according to still another embodiment of the present invention; and FIG. 4 schematically illustrates a wind power plant according to an embodiment of the present invention with emphasis of control features.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

The wind power plant 100 schematically illustrated in FIG. 1 is for providing electrical power to a utility grid 101. The wind power plant 100 thereby comprises at least one wind turbine 103 having a (not illustrated) wind turbine generator coupled to a wind turbine rotation shaft 105 at which plural rotor blades 107 are mounted. The wind turbine provides electrical power at an output terminal 109.

The wind power plant 100 further comprises at least one power conversion system 110 which comprises a plant motor 111 which is electrically coupled and configured to receive the electric power from the output terminal 109 of the at least one wind turbine 103. The plant motor 111 is further configured to convert the received electrical power into rotational power of a plant motor shaft 113. The power conversion system 110 further comprises a plant generator 115 which is mechanically coupled to the plant motor shaft 113 and which is electrically coupled or couplable to the utility grid 101. In the embodiment 100 of the wind power plant illustrated in FIG. 1, the plant generator 115 as well as the plant motor 111 are configured as synchronous machines.

Furthermore, in the embodiment 100 of the wind power plant illustrated in FIG. 1, the power conversion system comprises a mechanical inertial mass 117 which may for example be configured as a flywheel. The mechanical inertial mass 117 is coupled to the plant motor shaft 113. In particular, the plant motor shaft 113 and another shaft or a continuation of the plant motor shaft 119 are rotatably supported by respective bearings 121.

In the embodiment 100 illustrated in FIG. 1, plural other wind turbines 103 are, together with the at least one wind turbine 103, connected with their corresponding output terminals 109 to a common busbar 123 which is electrically connected at an input terminal 125 (e.g., representing an input terminal of power conversion system 110) of the plant motor. Thus, the accumulated electrical power 127 generated by the plural wind turbines 103 is supplied as a driving power to the plant motor 111.

The wind power plant 100 and in particular the power conversion system 110 further comprises a power conversion system controller 129 which is configured to control active power and/or reactive power and/or voltage at a power conversion system output terminal 131 and/or at a power conversion system input terminal which is in the illustrated embodiment established by the terminal 125 of the plant motor 111. For the control, the power conversion system controller 129 may receive measurement values related to the utility grid 101 or related to a plant grid constituted by power cables 133 including the busbar 123 and further not illustrated power cables. The power conversion system controller 129 is communicatively connected to the plant generator 115 as well as to the plant motor 111 and will be described in more detail with reference to FIG. 4 below.

FIG. 1 illustrates an embodiment 100 of a wind power plant which is configured as a centralized variant, wherein this wind power plant comprises exactly one power conversion system 110 to which the accumulated power 127 of all wind turbines 103 is supplied.

At least one wind turbine 103 of the wind power plant 100 may comprise a wind turbine converter (not illustrated) connected to the wind turbine generator for converting the generator power to a substantially fixed frequency power supplied to the wind turbine output terminal 109.

The embodiment 100 of the power plant further comprises a plant transformer 135 which is coupled to the output terminal 131 of all of the at least one power conversion system 110, in order to transform a voltage provided to the electrical utility grid 101 to a higher value. Thereby, the plant transformer comprises a low voltage side 136 and a high voltage side 138. As is illustrated with three power lines 139a, 139b, 139c, the AC power 141 output by the power conversion system 110 is a three-phase AC power. The AC power 141 may be transmitted via a transmission line to plural consumers.

FIG. 2 schematically illustrates a wind power plant 200 according to another embodiment of the present invention. The wind power plant 200 has similarities with the wind power plant 100 illustrated in FIG. 1, but is here configured as a decentralized version. Therein, the wind power plant comprises plural power conversion systems 210a, 210b, 210c. Each one of the plural power conversion systems is electrically coupled to at least one wind turbine, i.e., at least one wind turbine 203a or at least one wind turbine 203b or at least one wind turbine 203c, respectively. The respective output terminals 231a, 231b, 231c of the respective power conversion systems 210a, 210b, 210c are electrically connected to a busbar 234 which is connected to the plant transformer 235.

FIG. 3 schematically illustrates a wind power plant 300 according to an embodiment of the present invention, wherein the wind power plant further, different from the wind power plants 100 and 200 illustrated in FIGS. 1 and 2, comprises at least one power generating component 341a, 341b which is different from a wind turbine, and which is connected such as to supply the electrical power and/or the mechanical power to the plant motor 311. The at least one power generating component may be at least one of: at least one photovoltaic cell; at least one thermal energy storage; at least one steam turbine; at least one gas turbine, and/or at least an Electric Power Storage system, e.g., Li-ion batteries.

In the illustrated embodiment, the power generating component 341a is configured as or comprises a plurality of photovoltaic cells 343. Furthermore, the power generating component 341b is configured as a steam turbine system which comprises thermal storage plant 345 and a steam turbine 347 comprising tubing or piping 349 which conduct hot steam which has been heated up in a heat exchanger 351 comprised within the thermal storage plant 345. Herein, the thermal storage plant comprises an electrical heater 353 which may be operated by using AC power via electrical cables 355 from the at least one wind turbine 303. The turbine system 341b further comprises a pump 357 as well as a valve 359, in order to circulate the steam within the tubing 349 and lead it via the heat exchanger 351 to the steam turbine 347. The steam turbine 347 comprises a steam turbine shaft 361 which is mechanically coupled to the motor shaft 313 of the plant motor 317. Thus, upon rotation of the steam turbine shaft 361, the motor 317 is mechanically driven additionally to the driving of the motor by the electric energy or electric power 327 received from the wind turbines 303 as well as from the photovoltaic plant 341a. Since the photovoltaic cells 343 generate DC power, a DC-AC converter 363 is connected to the output terminal of the photovoltaic cells 343 to convert the DC power into AC power having the same frequency (for example 50 Hz or 60 Hz) as the AC power as generated by the wind turbines 303.

During certain conditions, e.g., highly favourable weather conditions, the wind power plant according to any of the examples disclosed, may generate more power than it can inject to grid and/or store, therefore leading to a surplus of energy. In such cases, the wind power plant may usually avoid generating more power than it can inject and/or store.

In order to avoid not generating such extra energy, in some examples (not shown), the wind power plant may further comprise a Hydrogen plant. Therefore, in the event a surplus of energy is generated, the Hydrogen plant may receive such generated extra energy to produce green Hydrogen (H2).

The hydrogen power plant may be connected to the output of the at least one wind turbine and/or to at least one power generating component e.g., one thermal energy storage or an Electric Power Storage system, in order to obtain power for operating i.e., to generate hydrogen when a surplus of energy is generated.

Thus, the wind power plant may be more efficient as any surplus energy may be employed on Hydrogen generation rather losing or not generating it. Additionally, the maximum energy generating capacity of the wind power plant may be ensured thereby further improving the efficiency of the wind power plant.

In examples wherein the wind power plant comprises a Hydrogen plant, the power conversion system controller may determine the amount or percentage of generated power to be injected to grid, stored and/or provided to the Hydrogen plant. In an example, about 40-60% of the generated power may be injected to the grid, about 20-40% of the generated power may be stored and about 10-20% of the generated power may be provided to the Hydrogen plant.

Embodiments of the present invention provide a wind power plant as a "real grid forming synchronous renewable plant (RGFSRP)" wherein two synchronous machines are used and coupled on a mechanical shaft. One of these machines, i.e., the plant generator 115, is coupled to the plant motor 111, such that the plant motor drives the plant generator 115. A mechanical inertia (such as flywheel 117) can optionally be included to provide the inertia that could be required by the utility grid 101. Thereby, in particular, frequency support of the utility grid can be provided. Also, a steam turbine, for example steam turbine 347 illustrated in FIG. 3, may optionally be included to provide thermal energy storage to assure energy during no renewable energy time/days, i.e., when no wind or no sufficient sun irradiation is present.

Synchronous machines may be commonly used in conventional power plants. Furthermore, it is proposed to use a similar or same control as in a conventional power plant for controlling the synchronous machines. FIG. 4 schematically illustrates a wind power plant 400 according to still another embodiment of the present invention, wherein emphasis is put on control issues. The power generating equipment 441a, 441b are similar to the power generating equipment 341a, 341b illustrated in FIG. 3 and they are also similarly connected to the respective power output terminals of the at least one wind turbine 403.

The power conversion system controller 429 of the embodiment 400 of the power plant illustrated in FIG. 4 comprises a plant motor controller 463 and a plant generator controller 465. The plant motor controller 463 is configured to receive a plant active power reference signal 467 and is configured to determine individual active power reference signals 469 for the at least one wind turbine 403 and/or the at least one power generating component 441a, 441b and supply the individual active power reference signals 469 to the at least one wind turbine 403 and/or the power generating component 441a, 441b. The plant motor controller 463 is further configured to control the plant grid voltage by controlling the plant motor 411 to output a reference plant grid reactive power to the plant grid 423, 433. Thereby, the plant motor controller 463 utilizes an automatic voltage regulator 471 which receives measurement values 473 regarding plant grid voltage from a voltage sensor 475. The automatic voltage regulator 471 outputs control signals to excitation system 472 that controls motor stator windings 474.

The plant generator controller 465 is configured to control the plant generator 415 to output a reference utility grid reactive power to the utility grid 401. Thereby, the plant generator controller utilizes an automatic voltage regulator 477 which receives measurement values 479 from a grid sensor 481 which measures electrical properties, such as voltage of the utility grid 401. The automatic voltage regulator 477 outputs control signals to excitation system 470 that controls generator stator windings 476.

Furthermore, the wind power plant 400 comprises a load frequency controller 483 which is configured to receive measurement values of the utility grid frequency from the sensors 481 and to determine a plant active power reference signal 485 based on the utility grid frequency. Furthermore, the load frequency controller 483 is configured to supply the plant active power reference signal 485 to the plant motor controller 463, in particular via the signal 467.

Furthermore, the plant active power reference signal 485 is also supplied to the photovoltaic plant 441a, in particular to a photovoltaic plant controller 487. Furthermore, the plant active power reference signal is supplied to the wind turbine 403, in particular via a wind turbine controller 489. In particular, a module 488 calculates an individual wind power reference for the wind turbine and a module 486 calculates an individual photovoltaic cell reference for the photovoltaic plant 441a.

The plant active power reference signal 485 is also supplied to the steam turbine system 441b, via a module 491 which calculates therefrom an individual turbine power reference, and which is supplied to a thermal storage controller 493 which controls the thermal storage as well as the steam turbine.

According to an embodiment, the real grid forming synchronous renewable plant for example illustrated in FIGS. 1, 2, 3, 4, provides a shaft torque to the plant generator by the renewable plant motor and/or the energy storage turbine. Therefore, the load frequency controller 483 sends the torque reference to the renewable plant motor and turbine controls. The renewable plant motor control sends the power references to the renewable devices or could be configured in maximum power point tracker (MPPT).

In an embodiment of the real grid forming synchronous renewable plant, the voltage and the reactive power delivery to the grid may be controlled by the plant generator automatic voltage regulator. In an embodiment, the voltage and the reactive power delivery to the renewable plant devices are controlled by the plant motor automatic voltage regulator. The plant motor automatic voltage regulator can be configured to operate the renewable plant devices at their maximum efficiency point.

The renewable plant devices can be designed independently to the country-specific grid code requirements using the same standardized hardware and software all over the world. The renewable plant generator, the plant motor and their controls may be designed to comply with the grid code requirements of the particular countries or areas.

In an embodiment of the real grid forming synchronous renewable plant, with energy storage capability, the plant generator may assure the same power quality and availability as a conventional power plant.

The plant generator, for example plant generator 115, 215, 315, 415 illustrated in FIGS. 1 to 4, may be a synchronous machine to simplify the system. It needs to be a wound machine (not PMS) to be able to control the flux (of the stator or the permanent magnets).

Embodiments of the present invention may provide the following advantages:

The grid power quality may be improved in particular to the same level as a conventional power plant, for example a fossil fuel-based power plant. Cost reduction and standardization of electrical components may be achieved, and the design may be optimized from electrical side assessment point of view.

The cost of the wind turbines may be reduced, in particular regarding the mechanical parts. The equipment may be optimized in efficiency and optimized in mechanical load resistance due to more time to respond to electrical grid events (i.e., lower pitch speed requirements).

Embodiments of the present invention may enable easier and cheaper integration of wind energy with energy storage plants that need grid synchronous generators.

Furthermore, higher availability and reduced downtime can be achieved with the introduction of redundant synchronous generators in the same drive.

The power conversion system may further provide compliance with future grid code requirements while the wind turbines itself may not be needed to be replaced or changed. Furthermore, the electrical studies necessary to integrate new wind power plants into the electrical grid may be simplified.

Systems in simplicity may translate also into higher reliability and lower maintenance of the wind power plant.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind power plant for providing electrical power to a utility grid, the wind power plant comprising:
 at least one wind turbine having a wind turbine generator coupled to a wind turbine rotation shaft to which plural rotor blades are mounted, the wind turbine providing electric power at an output terminal;
 at least one power conversion system, each comprising:
 a plant motor electrically coupled and configured to receive the electric power from the output terminal of the at least one wind turbine and convert the received electric power into rotational power of a plant motor shaft;
 a plant generator mechanically coupled to the plant motor shaft and electrically coupleable to the electric utility grid;
 wherein the at least one of power conversion system further comprises:
 a power conversion system controller being configured to control active power at a power conversion system output terminal based on at least one reference value related to the utility grid;
 wherein the power conversion system controller comprises a plant motor controller communicatively coupled to the plant motor and a plant generator controller communicatively coupled the plant generator; and
 wherein the plant motor controller is configured to receive a plant active power reference signal, to determine individual active power reference signals for the at least one wind turbine and/or at least one power generating component based on the plant active power reference signal and supply the individual active power reference signals to the at least one wind turbine and/or the at least one power generating component.

2. The wind power plant according to claim 1, wherein the plant generator and/or the plant motor of at least one of the at least one power conversion system comprises a synchronous machine.

3. The wind power plant according to claim 1, wherein at least one of power conversion systems further comprising:
 a mechanical inertial mass, coupled or couplable to the respective plant motor shaft.

4. The wind power plant according to claim 1, wherein a value of inertia of the wind power plant amounts to between 2 sec and 5 sec.

5. The wind power plant according to claim 1, wherein the power conversion system controller is further configured to control the active power at a power conversion system output terminal and/or at the utility grid and/or at a power conversion system input terminal based on at least one reference value and/or measurement values related to the utility grid and/or related to a plant grid.

6. The wind power plant according to claim 1, wherein the power conversion system controller is further configured to control reactive power and/or voltage at a power conversion system output terminal and/or at the utility grid and/or at a power conversion system input terminal based on at least one reference value and/or measurement values related to the utility grid and/or related to a plant grid.

7. The wind power plant according to claim 1, further comprising the at least one power generating component, wherein the at least one power generating component is different from a wind turbine and being connected such as to supply electrical power and/or mechanical power to the plant motor,
 wherein the at least one power generating component comprises:
  at least one photovoltaic cell;
  at least one thermal energy storage;
  at least one electric energy storage;
  at least one steam turbine; and/or
  at least one gas turbine; and/or
 wherein the at least one power generating component enables black start of the wind power plant in case of insufficient wind.

8. The wind power plant according to claim 1, wherein the plant motor controller is configured to control the plant grid voltage by controlling the plant motor to output a reference plant grid reactive power to the plant grid.

9. The wind power plant according to claim 8, wherein to control the plant grid voltage the plant motor controller utilizes an automatic voltage regulator that receives measurement values regarding plant grid voltage.

10. The wind power plant according to claim 1, wherein the plant generator controller is configured to control the plant generator to output a reference utility grid reactive power to the utility grid;
 the plant generator controller utilizing an automatic voltage regulator that receives measurement values regarding utility grid voltage.

11. The wind power plant according to claim 1, further comprising a load frequency controller configured:
 to receive measurement values of a utility grid frequency;
 to determine a plant active power reference signal based on the utility grid frequency; and
 to supply the plant active power reference signal to the plant motor controller.

12. The wind power plant according to claim 1,
 at least one wind turbine further comprising:
  a wind turbine converter connected to the wind turbine generator for converting the generator power to a substantially fixed frequency power supplied to the wind turbine output terminal; and/or
 the plant further comprising:
  a plant transformer coupled to the output terminal of all of the at least one power conversion system, in order to transform a voltage provided to the electrical utility grid to a higher value.

13. The wind power plant according to claim 1, wherein the plant comprises exactly one power conversion system to which all wind turbines supply their output power.

14. The wind power plant according to claim 1, wherein the plant comprises at least two power conversion systems whose output terminals are electrically connected to a bus bar which is electrically connected to the utility grid, via a plant transformer.

15. The wind power plant according to claim 1, further comprising a hydrogen plant.

* * * * *